United States Patent Office 2,954,909
Patented Oct. 4, 1960

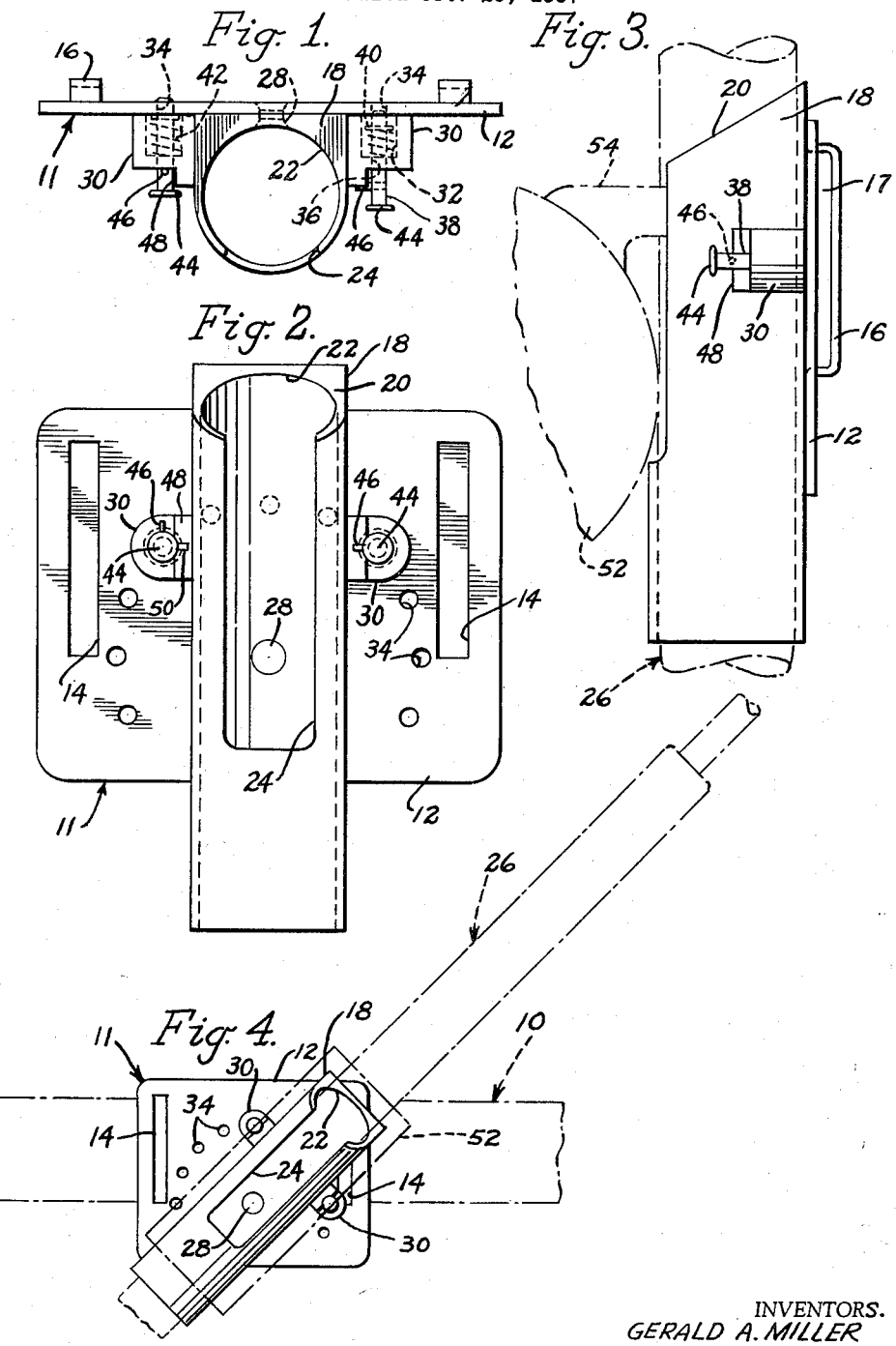

2,954,909

FISHING ROD HOLDER

Gerald A. Miller and Robert L. Walters, Pueblo, Colo., assignors to The Colorado Fishing Rod Holder Company, Pueblo, Colo., a corporation of Colorado Filed Oct. 29, 1957, Ser. No. 693,072

3 Claims. (Cl. 224—5)

This invention relates generally to fishing rod holders, and more particularly has reference to a device that is designed for holding a fishing rod while the fisherman is baiting a hook, changing a lure or fly, unhooking a fish, etc.

In many instances, it is inconvenient for the fisherman to perform operations of the character described above, due to the fact that he may not have, readily available, a place where he can rest the fishing rod. An instance of this occurs when the fisherman is in midstream, and in such an instance, it is necessary that he endeavor to hold the fishing rod while performing one of the operations described above. This is particularly difficult in that both hands should be fully free to perform the necessary operation.

In view of the above, it is proposed to provide a fishing rod holder that is attachable to the fisherman's belt, shirt, trousers, creel, or to any other suitable portion of the person's garments or fishing equipment.

A further object is to so design the holder that the fishing rod can be swiftly inserted in or removed from the same, with minimum difficulty.

Still another object is to so design the holder that with few or no modifications, it can be readily adapted for attachment to boats, docks, or other stationary objects.

Still another object is to provide a fishing rod holder of the character described that will be particularly designed for manufacture at a very low cost, will be comfortable when attached to the garments, will be efficient in holding fishing rods of various sizes or types, and will be swiftly adjustable to expose the fishing rod at a selected angle of inclination, either at the right or left side of the individual.

Other objects will appear from the following description, the claims appended thereto, and from the annexed drawing, in which like reference characters designate like parts throughout the several views, and wherein:

Figure 1 is a top plan view of a fishing rod holder according to the present invention;

Figure 2 is a front elevational view thereof;

Figure 3 is a side elevational view of the holder as seen from the right of Figure 2, a supported fishing rod being shown fragmentarily and in dotted lines; and Figure 4 is a reduced front elevational view of the holder, the fishing rod being shown fragmentarily and in dotted lines, the rod socket being in a selected position of adjustment, a belt on which the holder is mounted being shown fragmentarily and in dotted lines.

Referring to the drawing in detail, in Figure 4 a belt generally designated 10 is illustrated, on which is mounted the holder 11 constituting the present invention.

The holder 11 includes an approximately rectangular base plate 12, which preferably has rounded corners as shown, and which, though wholly flat in the illustrated example, could be slightly curved so as to conform to the curvature of the particular support on which it is mounted.

The base plate 12 is formed, in close proximity to the respective side edges thereof, with vertically elongated slots 14, resulting from striking of flat, correspondingly vertically elongated attaching loops 16 out of the materials of the base plate.

The loops 16 are struck rearwardly from the base plate as best shown in Figures 1 and 3, and define slots 17 through which belt 10 extends, to support the base plate upon the belt.

Obviously, the base plate could be located at the left or right hand side of the person, whichever is desired, and could even be shifted along the belt to the front of the person. Then again, the base plate could be readily adapted for attachment to a suitable stationary support, such as a dock, not shown.

In any event, designated at 18 is an elongated, straight, large diameter tubular socket or sleeve, formed open at both ends.

The sleeve 18 has an upper end surface 20 which is beveled, so as to lie wholly in a plane oblique to the sleeve as clearly shown in Figure 3. The bore 22 of the sleeve opens upon said end surface and is of constant diameter through the full length of the sleeve. Communicating with the bore is an elongated, wide reel slot 24 opening at one end upon the end surface 20, the other end of the reel slot being closed and terminating a substantial distance short of the lower end of the sleeve.

Designated generally at 26 is a conventional fishing rod, this being insertable in the sleeve in the manner shown in Figure 3. The sleeve is pivotally connected by a rivet 28 to the base plate 12 medially between the opposite side edges of the base plate, with the pivot axis extending in perpendicularly intersecting relation to the longitudinal median of the sleeve.

The sleeve can be adjusted to selected positions about the mentioned axis, and in a typical arrangement would be inclined as at Figure 4, so that the fishing rod 26 is inclined correspondingly from the vertical.

Fixedly secured to opposite sides of the sleeve are blocks 30 oppositely but identically formed and projecting laterally outwardly from said opposite sides of the sleeve. The blocks 30 are formed with cavities 32, and formed in the base plate 12 in communication with the rear ends of the cavities 32 are openings 34 reduced in diameter relative to the diameter of the cavities. Openings 36 are formed in the outer surfaces of the blocks, in coaxial alignment with the openings 34. The openings 36 communicate with the front ends of the cavities and are of a diameter reduced in respect to the diameter of the cavities.

Detents 38, in the form of straight pins, are axially reciprocable in the blocks, the detents being of a diameter corresponding to that of the openings 34, 36. Within the cavities, the detents have collars 40 rigid with the shanks of the detents, and bearing against the collars are compression, coil springs receiving said shanks with the cavities at their other ends, the springs bear against the front walls of the blocks so as to continuously urge the detents in a direction towards the base plate 12, through the openings 34. The collars 40 are so disposed that when the springs bias the detents inwardly within the blocks to their maximum extent, through openings 34, the detents will project only slightly beyond the back surface of the base plate as will be readily noted by observing the position of the detent shown at the left in Figure 1.

Formed upon the outer ends of the detents are flattened heads 44, and spaced axially along the shanks of the detents from heads 44 and disposed exteriorly of the blocks, are laterally outwardly projecting stop pins 46. Pins 46 are adapted to bear against shoulders 48 formed upon the blocks on the front walls of the blocks at one side of the detents. The pins 46 bear against said shoulders when the detents are retracted as will be noted by reference to the position of the detents shown at right in Figures 1 and 2. When a detent is retracted against the restraint of its spring 42, it is withdrawn entirely from the opening 34 within the cavity 32. In this position of the parts, the stop pin 46 is adapted to seat in a recess 50 formed in shoulder 48, the recess 50 extending radially from the detent as shown in Figure 2. Thus, the detent is locked releasably in its retracted position, and is held against accidental rotation from its locked position. This is desirable, since rotation of the detent from its locked, retracted position shown at the right in Figure 1, even through 90 degrees, would free the detent and permit it to be biased axially by the expanding spring 42 into one of the openings 34.

Openings 34 of the base plate are arranged in an arcuate series, curved about and having as its center the pivot axis of the sleeve, said pivot axis being defined by the center point of rivet 28. This is shown in Figure 2, and the arrangement of parts is such that in each position to which the sleeve is rotated about its pivot, the shanks of the detents 38 may be registered with selected openings 34. As a result, on unlocking of the shanks and partial rotation, the stop pins 46 thereof will clear the shoulders 48 and as spring 42 expands it will engage the detent in the selected openings 34. This will securely lock the sleeve 18 in a selected position of pivotal adjustment about its axis.

It will be apparent from the foregoing description that in use of the device, the sleeve can be adjusted to a selected position of inclination and releasably locked in said position, according to the desires of the particular user. Then, the fishing rod is insertable in and removable from the sleeve, through the upper end thereof. Movement of the fishing rod downwardly within the sleeve is limited by the reel 52 thereof, which extends at its base 54 through slot 24.

In this way, both hands are free to change lures, remove hooked fish, etc., and at the same time the fishing rod is held in a position projecting forwardly upwardly from a side of the person, which position will provide maximum convenience so far as the user is concerned, and will be adapted to hold the fishing rod ready for regular fishing operations.

Of course, any of various materials might be used, and in addition many mechanical expedients can be employed, so long as there is no departure from the spirit of the invention and from the scope of the appended claims.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fishing rod holder comprising: a flat base plate including means to connect the same to the wearing apparel of a user; an elongated, straight, tubular socket having a longitudinal fishing-rod-receiving bore opening upon at least one end of the socket, the length of said socket extending parallel to the plane of the base plate, said socket being pivotally connected to the base plate, the axis of the pivotal connection extending normally to said length of the socket; a pair of blocks, said blocks being fixed to and projecting laterally outwardly from opposite sides of the socket; detent pins mounted in the blocks for rotation, and for movement in the direction of their lengths in paths parallel to said pivot axis, the plate having a series of openings curved about said pivot axis, the detent pins being registrable with selected openings in correspondingly selected positions to which the socket is rotated about said axis and being longitudinally movable in one direction through said openings to releasably lock the socket in each selected position of adjustment to which it is so rotated, said detent pins including laterally projecting stop pins at one end and the blocks including shoulders at one side of the detent pins against which said stop pins bear on longitudinal movement of the detent pins in an opposite direction out of the openings and on rotation of the detent pins in the blocks, the stop pins and shoulders cooperating to hold the detent pins out of the openings; and springs circumposed about the detent pins and tensioned to bias the same in the first named direction.

2. A fishing rod holder comprising: a flat base plate including means to connect the same to the wearing apparel of a user; an elongated, straight, tubular socket having a longitudinal fishing-rod-receiving bore opening upon at least one end of the socket, the length of said socket extending parallel to the plane of the base plate, said socket being pivotally connected to the base plate, the axis of the pivotal connection extending normally to said length of the socket; a pair of blocks, said blocks being fixed to and projecting laterally outwardly from opposite sides of the socket; detent pins mounted in the blocks for rotation, and for movement in the direction of their lengths in paths parallel to said pivot axis, the plate having a series of openings curved about said pivot axis, the detent pins being registrable with selected openings in correspondingly selected positions to which the socket is rotated about said axis and being longitudinally movable in one direction through said openings to releasably lock the socket in each selected position of adjustment to which it is so rotated, said detent pins including laterally projecting stop pins at one end and the blocks including shoulders at one side of the detent pins against which said stop pins bear on longitudinal movement of the detent pins in an opposite direction out of the openings and on rotation of the detent pins in the blocks, the stop pins and shoulders cooperating to hold the detent pins out of the openings; and springs circumposed about the detent pins and tensioned to bias the same in the first named direction, the shoulders having recesses extending radially from the axis of rotation of the detent pins and receiving the stop pins to engage the detent pins against rotatable movement when the stop pins are engaged against the shoulders.

3. In a fishing rod holder which includes a substantially rectangular, flat base plate, a tubular socket provided with fishing rod receiving means, said socket being pivotally secured to said base, and means for releasably securing said socket at selected locations about its pivotal axis, that improvement which comprises; a pair of blocks projecting laterally from opposite sides of said socket; a detent pin operably mounted in each of said blocks for linear reciprocating movement in a direction substantially perpendicular to the plane of said plate, said detent pins including laterally projecting stop pins adjacent their outer ends, the blocks being provided with shoulders positioned at the ends thereof remote from said plate, and said detent pins being rotatable whereby said stop pins are movable to a position wherein they are engageable with said shoulders to hold said detent pins in a retracted position spaced from said plate, said plate having a series of openings formed therein at selected intervals, and said detent pins being registrable with and receivable in selected pairs of said openings, thereby to releasably secure said socket at said selected locations.

References Cited in the file of this patent

UNITED STATES PATENTS

| | | |
|---|---|---|
| 347,343 | Haitz | Aug. 17, 1886 |
| 1,475,960 | Moody | Dec. 4, 1923 |
| 1,701,417 | Minelli | Feb. 5, 1929 |
| 2,576,624 | Miller | Nov. 27, 1951 |
| 2,692,106 | Herrmann | Oct. 19, 1954 |